Patented June 17, 1924.

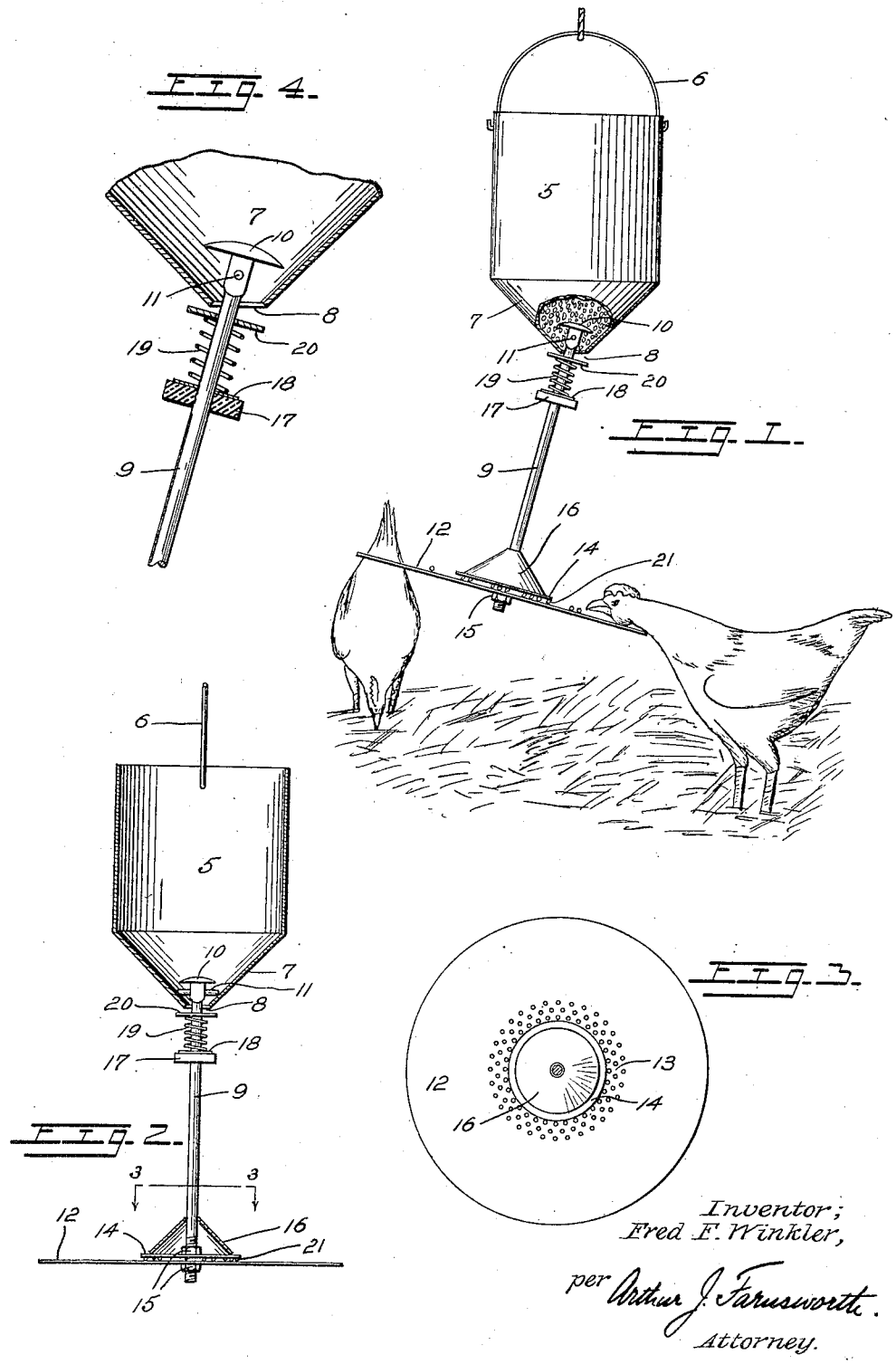

1,498,220

UNITED STATES PATENT OFFICE.

FRED F. WINKLER, OF LOS ANGELES, CALIFORNIA.

POULTRY FEEDER.

Application filed September 4, 1923. Serial No. 660,843.

*To all whom it may concern:*

Be it known that I, FRED F. WINKLER, a citizen of the United States, residing at Los Angeles, in the county of Los Angeles and State of California, have invented a new and useful Poultry Feeder, of which a specification is set forth below.

I have illustrated, and shall describe herein, a preferred form of my improvement, and shall specifically mention certain of its more important objects. I desire to be understood, however, that various changes and adaptations may be made without departing from the essence of the invention, which is not limited to the forms disclosed except as set forth in the appended claims; and that objects and advantages in addition to those specifically mentioned will appear hereinafter and are included within its scope.

My invention relates to improvements in baited poultry feeders of the hopper type, in which the feed is released by the action of the fowls in seeking to obtain the bait. Among the salient objects of my improvement are; first, to provide a self-feeder adapted for use with a variety of kinds and sizes of feed; second, to afford facilities for releasing the feed substantially in accordance with the needs of the fowls; third, to scatter the released feed in a manner calculated to compel the fowls to scratch for it; and, fourth, to accomplish the above by means of a relatively simple and inexpensive device that is thoroughly dependable for the purpose intended.

My objects are attained by means of the construction illustrated in the accompanying drawing, in which—

Figure 1 is a side elevation of my feeder in operation, with certain portions broken away to better illustrate its construction;

Figure 2 is an elevation of the device, mostly in central section, on a plane revolved ninety degrees from the picture plane of Fig. 1;

Figure 3 is a plan view of the lower portion of the device taken on the line 3—3 of Fig. 2; and Figure 4 is an enlarged vertical cross section of the governing mechanism and the lower end of the hopper.

Similar numerals refer to similar parts throughout the several views.

The feed hopper 5 may be made of any suitable size and proportions for the service to be rendered. It is preferably supplied with a bail 6, or other convenient means for suspension, and has an inverted conical bottom 7, with a central discharge orifice at 8.

The pendulum bar 9 is preferably made with a slightly convex head 10, having a fairly acute edge, as this plays a part in properly releasing the feed. Beneath the head, and in relatively close proximity thereto, is a transverse suspension pin 11, having smoothly rounded ends. This pin is fixed in the pendulum bar in such a manner that its ends project equally therefrom, and is of a length sufficiently great to prevent its dropping through orifice 8 at any position the pendulum bar is capable of assuming.

At the lower end of the pendulum bar is a relatively large circular plate 12, formed with a foraminous concentric ring 13. Above this is a smaller resilient plate 14, having a diameter slightly less than the inner diameter of the foraminous ring, and concentric with the larger plate. These two plates are conveniently and adjustably attached to the lower end of the pendulum bar by means of the nuts 15. Above plate 14 is a small truncated cone 16, loosely resting thereon, and having a base of about the same size as plate 14.

The governing mechanism, which regulates the discharge of the feed, comprises a substantial friction washer 17, of rubber or other suitable friction material; a backing washer 18 above it; a light helical spring 19; and a top washer 20. These parts are mounted upon the pendulum bar, near its upper end, and beneath orifice 8. The governing mechanism is slidable on the pendulum bar for adjusting the space between washer 20 and the hopper orifice, and maintains its position on the bar by means of the frictional contact of washer 17.

In use my device is suspended by bail 6 in such a manner that plate 12 clears the ground by about the height of the lower part of a fowl's neck when it is standing erect. The plate must have sufficient room to swing sideways in any direction. Baiting is accomplished by inserting grains of feed between plates 12 and 14, as shown at 21 in Figs. 1 and 2, the resiliency of the smaller plate holding the bait sufficiently tight, if desired, to prevent the fowls from extracting it.

The bait thus placed will always be visible and attract attention of the fowls when there is no feed on the ground, and they are standing erect. If they are hungry they will attempt to obtain it and, in so doing, they are compelled to reach over the edge of plate 12 and will move the pendulum bar to one side as in Fig. 1. This widens the space between one side of washer 20 and the hopper orifice and, at the same time, the action of the corresponding side of head 10 will push the feed beneath it downward. A small quantity of feed will accordingly be discharged from the hopper. In falling it will strike cone 16, or the inclined surface of plate 12, and be scattered on the ground in various directions away from the device. The fowls will then scratch for it, and repeat the operation indefinitely.

The deflection of the pendulum bar will increase the space between the opposite side of head 10 and the bottom of the hopper, and allow the feed on that side to fall down beneath the head. The feed at this side of the device cannot escape, however, since washer 20 at this point is closer than normal to the hopper orifice. The deflection of the pendulum bar in either direction therefore will tend to discharge a small quantity of feed from one side, and replenish the feed beneath head 10 at the other side of the device.

The quantity of feed discharged by the movement of the pendulum bar may be regulated by sliding the friction washer 17 up or down, and thus adjusting the vertical position of the governor. Top washer 20 is variably spaced from the orifice in this manner. The function of the light helical spring 19 is to permit the top washer, which is loose on the pendulum bar, to yield when necessary to allow unusually large particles of feed to pass.

The foraminous portion of plate 12 is for the purpose of catching and removably retaining a small portion of the feed that falls upon it. Certain of the smaller grains of feed will inevitably become lodged in the small holes of this portion of the plate, and can be picked out by the fowls. This provision prevents the bait that is permanently held under plate 14 from becoming "stale," since the fowls frequently can obtain particles of food from this portion of the plate and are unable to distinguish between the removable and unremovable particles. Consequently the latter never cease to be attractive.

I have observed that fowls quickly become familiar with the manner in which my device operates, and that they may be depended upon thereafter to feed themselves properly in the manner described. In such cases it is unnecessary to bait the feeder, but, as uninstructed fowls are frequently present in a flock, it is usually desirable to make use of the fixed bait.

I desire to call attention to the fact that the governor may be used as a gate to completely shut off the feed supply when desired. This is accomplished by sliding washer 17 up the pendulum bar as far as possible, so that washer 20 closes orifice 8. I would also mention that plate 14, if desired, may be made foraminous, or with depressions in its surface, so as to adapt it for holding the bait more securely. In the case of hard grains, having a variety of sizes, it is usually preferable to do this.

I claim as my invention:

1. A poultry feeder comprising; an elevated hopper having a conical bottom with a central orifice therein; an intermediately pivoted pendulous bar extending through said orifice having a discoidal head within the hopper adjacent the orifice; and a vertically adjustable yieldable disk on said bar under said orifice.

2. A poultry feeder comprising; an elevated hopper having a conical bottom with a central orifice therein; a pendulous bar extending through said orifice having a discoidal head and intermediate pivotal support, both within the hopper adjacent the orifice; and a vertically adjustable yieldable disk on said bar under said orifice.

3. A poultry feeder comprising; an elevated hopper having a conical bottom with a central orifice therein; an intermediately pivoted pendulous bar extending through said orifice having a discoidal head within the hopper adjacent the orifice; and a vertically adjustable discharge governor on said bar under the orifice; said governor embracing a friction washer, a helical spring above the washer, and a disk above the spring.

4. A poultry feeder comprising; an elevated hopper having a bottom orifice therein; a pendulous bar having a vertically adjustable yieldable disk thereon under said orifice; and a relatively large centrally baited disk at the lower extremity of said bar.

5. A poultry feeder comprising; an elevated hopper having a bottom orifice therein; a pendulous bar having a vertically adjustable yieldable disk thereon under said orifice; a relatively large centrally baited disk at the lower extremity of said bar; and a feed deflecting cone above the baited disk.

6. A poultry feeder comprising; an elevated hopper having a bottom orifice therein; a pendulous bar having a yieldable disk thereon under said orifice and co-axial with it; a relatively large disk at the lower extremity of said bar; and a feed deflecting cone above said large disk; the large disk having an intermediate foraminous ring portion adapted for retaining feed thereon; substantially as described.

FRED F. WINKLER.